United States Patent
Bronnert

Patent Number: 5,904,382
Date of Patent: May 18, 1999

[54] ASEPTIC SEAL

[76] Inventor: Herve X. Bronnert, 21495 Partridge Ct., Brookfield, Wis. 53005

[21] Appl. No.: 08/747,865

[22] Filed: Nov. 13, 1996

[51] Int. Cl.⁶ ..................................................... F16L 23/00
[52] U.S. Cl. .......................... 285/349; 285/350; 285/918; 285/365; 285/363
[58] Field of Search ................................... 285/331, 363, 285/365, 111, 918, 917, 350, 336, 349, 364; 277/608, 626

[56] References Cited

U.S. PATENT DOCUMENTS

| | | | |
|---|---|---|---|
| 448,765 | 3/1891 | Kaiser | 285/349 |
| 648,232 | 4/1900 | Brandt | 285/331 |
| 1,181,060 | 4/1916 | Bennett | 285/349 |
| 1,272,267 | 7/1918 | Horton | 285/336 |
| 1,368,196 | 2/1921 | Peck | 285/349 |
| 1,961,583 | 6/1934 | Hamer | 285/336 |
| 2,342,422 | 2/1944 | Morehead | 285/336 |
| 2,458,817 | 1/1949 | Wolfram | 285/350 |
| 2,553,222 | 5/1951 | Wallgren et al. | 285/350 |
| 2,688,497 | 9/1954 | Brisack | 285/350 |
| 2,789,844 | 4/1957 | Kessler | 285/365 |
| 3,219,369 | 11/1965 | Little | 285/363 |
| 3,544,138 | 12/1970 | Von Eiff | 285/336 |
| 3,589,750 | 6/1971 | Dunmire | 285/363 |
| 4,362,327 | 12/1982 | Mieth | 285/365 |
| 4,817,994 | 4/1989 | Bronnert . | |
| 5,076,617 | 12/1991 | Bronnert . | |
| 5,490,680 | 2/1996 | Patel et al. | 277/608 |

FOREIGN PATENT DOCUMENTS

| | | | |
|---|---|---|---|
| 22253 | 2/1948 | Finland | 285/363 |
| 507468 | 9/1930 | Germany | 285/336 |
| 843936 | 7/1952 | Germany | 285/365 |
| 7069 | 7/1894 | United Kingdom | 285/336 |
| 577700 | 5/1946 | United Kingdom | 285/111 |
| 828940 | 2/1960 | United Kingdom | 285/363 |
| 2026116 | 1/1980 | United Kingdom | 285/349 |

Primary Examiner—Eric K. Nicholson
Attorney, Agent, or Firm—Foley & Lardner

[57] ABSTRACT

An aseptic or sanitary pipe or tube fitting including a first ferrule having an outer radial surface, a counterbore and an inner annular surface, and a second ferrule having an inner radial surface, an outer radial surface and an outer annular surface matingly engaging the inner annular surface and inner radial surface of the first ferrule, a recess in the outer radial surface and an O-ring forced into the recess by the inner radial surface of the first ferrule.

8 Claims, 2 Drawing Sheets

ASEPTIC SEAL

FIELD OF THE INVENTION

The present invention relates to an aseptic or sanitary pipe or tube fittings and joints for food processes and other related applications and more particularly to an assembly formed by the pipe or tube fittings having a gap and a triangular formed recess and a deformable O-ring seal forming a seal in the gap and recess.

BACKGROUND OF THE INVENTION

In my U.S. Pat. No. 4,817,994, entitled "Aseptic Pipe Joint," issued Apr. 4, 1989, and U.S. Pat. No. 5,076,617, entitled "Seal for Aseptic Fitting Assembly," issued Dec. 31, 1991, seal ring assemblies are shown and described for aseptic processing systems. These seal assemblies have particular application in the processing of foods and other products such as pharmaceuticals which require careful handling and appropriate precautions to provide sanitary equipment and thereby prevent contamination of the product. The seal-type assembly in the '994 patent is used to provide a seal in the ferrules of the pipe joints. This type of seal assembly, because of its circular configuration, does not provide a continuation of the internal surface of the pipe joint which would result in small trappings and build up of product in the joint.

The aseptic seal ring assembly described in the '617 patent uses a seal in the form of a U-shaped metallic ring filled with a resilient material such as rubber. The ring includes an enlarged flange on the end of each of the legs of the rings which are deformed to provide a metallic seal between the flanges of the pipe joint and the U-shaped rings. In this regard the U-shaped ring is provided with radial surfaces which are rotated into alignment with the radial surfaces of the pipe joint forming a metal-to-metal seal between the ring and the ferrule. This requires precise alignment in order to achieve metal-to-metal contact between the flanges.

SUMMARY OF THE PRESENT INVENTION

The aseptic seal ring assembly according to the present invention is used to seal the joint between the radial surfaces of pipe joint ferrules. The seal is in the form of an O-ring which is aligned with a triangular opening formed between the ferrules. The opening is in the form of an equilateral triangle with all of the angles at 60° or is a triangular opening of other angle combination such as 70-70-40 or 55-55-70, etc. or other more symmetric combinations such as 40-60-80 or 50-60-70, etc., depending on applications. A gap is provided in the inner triangular corner of the opening which allows for a small amount of O-ring surge into the gap at the product zone. The O-ring dimensions and the opening dimensions match in such a way that the O-ring is deformed from three sides and surges into the gap provided on the inner surface of the fitting filling the gap flush with the internal diameter of the ferrules.

One of the principal features of the invention is the provision of a sanitary seal for a pipe joint in an aseptic processing system in which the primary seal is a resilient O-ring which is deformed on assembly forcing a portion of the O-ring to surge flush with the inside diameter of the process tubing.

In accordance with another aspect of the invention a special opening is formed between the pipe joint ferrules in the form of an equilateral triangle geometry with all the angles at 60° and one corner partially opened by a gap controlling an amount of O-ring surge toward the product zone. The O-ring dimensions and the opening dimensions match in such a way that the O-ring is deformed from three sides and can only surge inwardly into the gap.

The design of this fitting allows for male/female ferrules for precise alignment, and metal-to-metal abutting contact for additional sealing safety. The O-ring is pressure actuated and will seal more strongly as the pressure rises. The seal can also be used if vacuum sealing is required.

A number of advantages are provided with this fitting such as the seal being positively held in place by the fitting, standard readily available O-rings of a wide variety of compounds can be used, and finally, both sealing surfaces in each ferrule are recessed to prevent scratching or denting damage which could effect the seal.

Other principal features and advantages of the invention will become apparent to those skilled in the art upon review of the following drawings, the detailed description and the appended claims.

BRIEF DESCRIPTION OF THE DRAWINGS

FIG. 6 is a cross-section view of the seal shown expanded into the gap flush with the inside diameter of the pipes.

Figure 1:
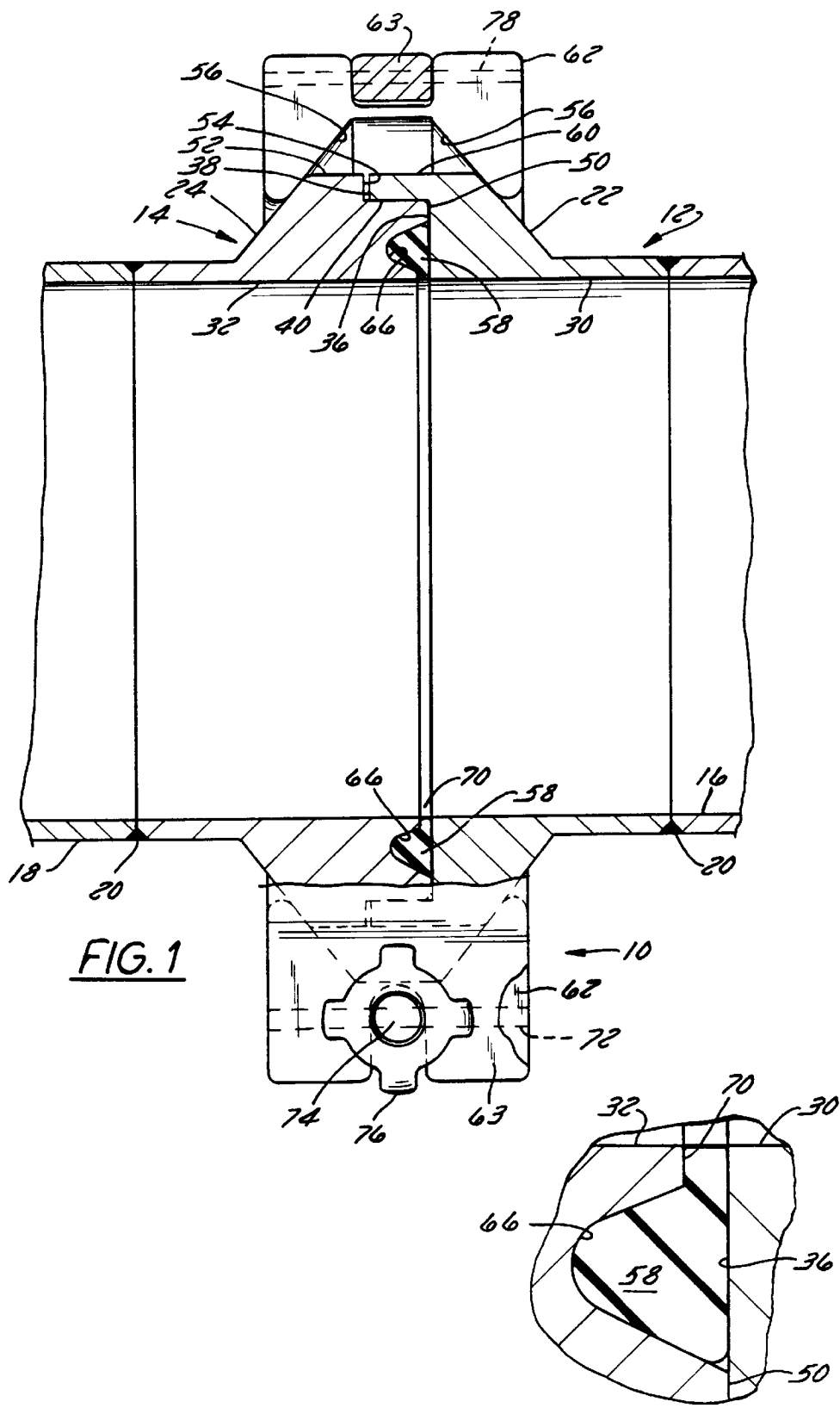
FIG. 1 is an elevation cross-section view of the joint assembly according to the invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1 the sanitary/aseptic fitting assembly 10 according to the present invention generally includes a pair of ferrules 12 and 14 which are shown connected to the ends of the tubes or pipes 16 and 18, respectively, by means of welds 20. Each of the ferrules 12 and 14 has a frusto conical outer surface 22 and 24 and internal bores 30 and 32 which conform with the internal diameters of the pipes 16 and 18, respectively.

The ferrule 12 is provided with an annular flange 60, a radial surface 38 and a counter bore 40 provided in the radial surface 38 of the ferrule 12 which includes an inner radial surface 36.

The ferrule 14 has a radial surface 50 and an annular surface 52. A notch 54 is formed in the radial surface 50 of the ferrule 14 which matingly engages the flange 60 formed on the outer perimeter of the ferrule 12. The ferrules 12 and 14 are clamped in position by means of clamp members 62 and 63 which are pivotally connected at one end by pin 65. The other end of the clamp members 62 and 63 is connected by a pin 72 in clamp member 62 and a threaded screw 74 pivotally mounted on pin 72 and a wing nut 76 aligned in a slot 75 in clamp member 63 and a wing nut 76.

In accordance with the present invention a V-shaped recess 66 is provided in the face of the radial surface 50 of the ferrule 14. The recess 66 is closed by the radial face 36 of the ferrule 12. An equal angular triangular opening is thus formed in between the ferrules. A gap 70 is provided between the inner surface of the triangular opening and the face 36 of the ferrule 12. Various polymers may be used to form the O-ring seal 66 between the ferrules. However, polymers, Silicone, Buna N, Ethylene propylene and Neoprene, having a durometer of 70–80 or less are preferred.

Figure 2:
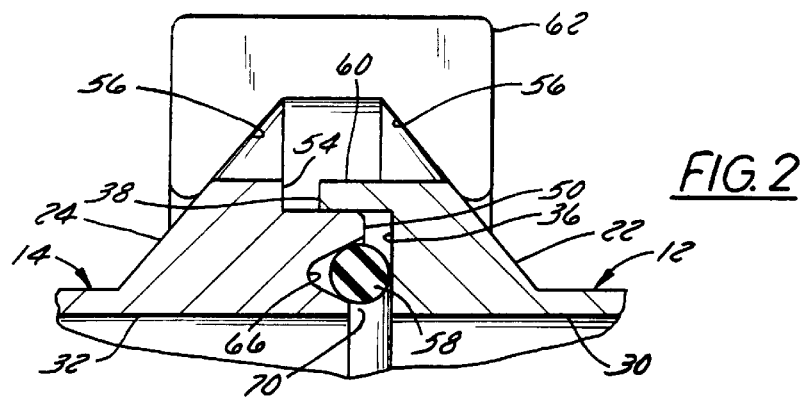
FIG. 2 is a cross-section view showing the O-ring seal aligned with the ferrules.
Figure 3:
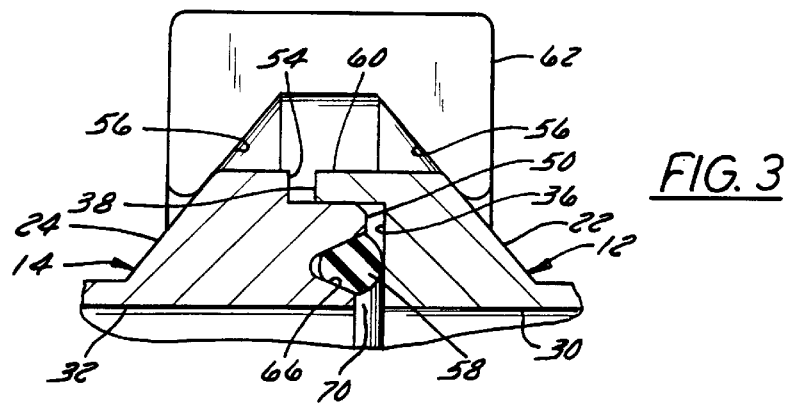
FIG. 3 is a view showing the seal of the clamp partially closed.
Figure 4:
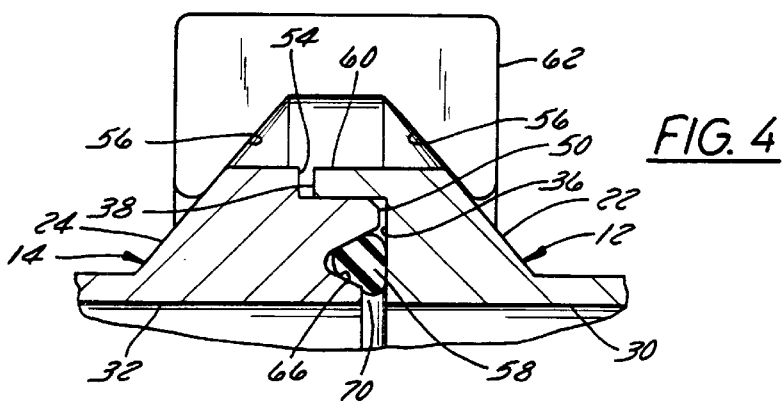
FIG. 4 shows the deformation of the O-ring just before closing of the ring assembly.
Figure 5:
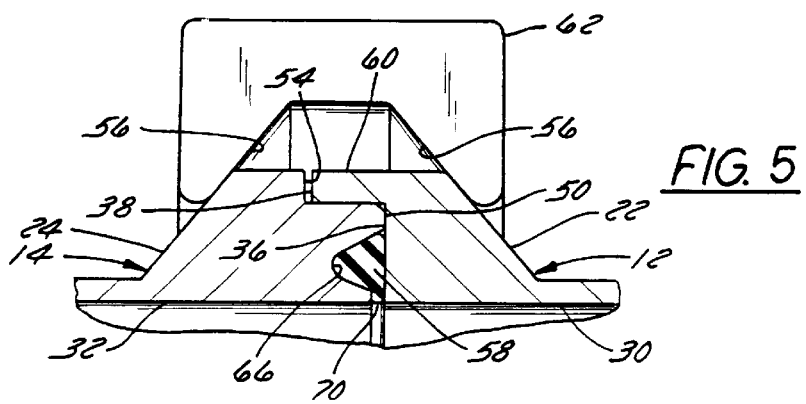
FIG. 5 shows the final closing of the ferrules with a portion of the O-ring seal filling the gap on the inner surface of the ferrule.

Referring to FIGS. 2–5, an O-ring 58 is shown in various stages of deformation as the pipe joint is closed from the initial position, FIG. 2, to the fully closed position, FIG. 5. In this regard the O-ring 58 shown in FIG. 2 is positioned in the recess 66 with the flange 60 aligned with the notch 54. The clamps 62 and 63 are initially closed by tightening the wing nut 76 to simultaneously close the ferrules 12 and 14. The O-ring 58 is initially deformed in the recess 66 as shown in FIG. 3 by tightening the wing nut 76. In FIG. 4 the O-ring is shown forced into the recess 66. In FIG. 5 the O-ring is shown seated in the recess with a portion of the O-ring filling the gap 70 and surging flush with the internal diameter of the ferrules 12 and 14.

Thus, it should be apparent that there has been provided in accordance with the present invention a sanitary seal that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An aseptic pipe joint comprising:
   a first ferrule attached to a first pipe and having an inner bore and a radial surface extending therefrom;
   a second ferrule attached to a second pipe and having an inner bore and a radial surface extending therefrom, the radial surfaces of the first and second ferrules adapted and arranged to matingly engage one another to cause the inner bores to approach one another but to remain spaced apart;
   a notch formed in the radial surface of the second ferrule at the inner bore and arranged to form a gap between the bores of the first and second ferrules when the ferrules are matingly engaged;
   a generally V-shaped recess in the radial surface of the second ferrule forming a generally triangular opening having one rounded corner, one angular corner and being open at one corner when the ferrules are matingly engaged, the gap communicating with said opening at the open corner; and
   an O-ring in said opening and adapted and arranged to be compressed and substantially deformed by the recess and the adjoining face of the radial surface of the first ferrule to urge a portion of the O-ring into the gap and to completely fill the gap when the ferrules are matingly engaged.

2. The pipe joint of claim 1 wherein the angle of the V-shaped recess would be 60° if the sides of the recess were extended to intersect one another and the adjoining faces form an opening generally in the shape of an equilateral triangle with one rounded corner, one open corner and one corner having a 60° angle.

3. A pipe joint comprising a pair of pipes having inner cylindrical surfaces and ferrules adapted to engage one another along mating radially extending faces, the ferrules having cylindrical bores coinciding with the inner surfaces of the pipes to be joined, the improvement comprising:
   a gap between the bores of the ferrules and an annular opening being generally triangular in cross-section formed at the faces of the ferrules and having three corners, one of said corners being open and another of said corners being rounded, the gap being located at the one open corner and being in communication with the opening, an O-ring located in the opening and constructed and arranged to be substantially deformed and sealingly engage the open corner of the opening and to be urged into the gap to completely fill the gap when the faces of the ferrules engage one another.

4. The pipe joint of claim 3 wherein the annular opening is defined by an annular, generally V-shaped recess in the face of one ferrule and the adjacent face of the second ferrule.

5. The pipe joint according to claim 3 wherein said O-ring has a durometer of 70 or less.

6. The pipe joint according to claim 5 wherein the O-ring is formed of silicon, neoprene, ethylene propylene, buna N or buna H.

7. The pipe joint according to claim 1 wherein said O-ring has a durometer of 70 or less.

8. The pipe joint according to claim 7 wherein the O-ring is formed of Silicon, Neoprene, Ethylene propylene, Buna N or Buna H.

* * * * *